(12) United States Patent
Huras

(10) Patent No.: US 6,915,408 B2
(45) Date of Patent: Jul. 5, 2005

(54) IMPLEMENTATION OF THREAD-STATIC DATA IN MULTI-THREADED COMPUTER SYSTEMS

(75) Inventor: Matthew A. Huras, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 10/273,566

(22) Filed: Oct. 17, 2002

(65) Prior Publication Data
US 2003/0221085 A1 Nov. 27, 2003

(30) Foreign Application Priority Data

May 22, 2002 (CA) ............................................ 2387200

(51) Int. Cl.$^7$ .............................................. G06F 12/00
(52) U.S. Cl. ...................................... 711/220; 711/200
(58) Field of Search ................................ 711/212, 200, 711/132; 710/49; 712/224, 5, 202; 718/106

(56) References Cited

U.S. PATENT DOCUMENTS

| | | | | |
|---|---|---|---|---|
| 5,511,192 A | * | 4/1996 | Shirakihara | 718/106 |
| 6,647,483 B1 | * | 11/2003 | Hoglund et al. | 711/214 |
| 2004/0015678 A1 | * | 1/2004 | Strom | 712/202 |

* cited by examiner

Primary Examiner—Kimberly McLean-Mayo

(74) Attorney, Agent, or Firm—Marilyn Smith Dawkins

(57) ABSTRACT

One of the primary difficulties that result from using static variables in multi-threaded computer programs is that changes to a static variable made by one thread will be seen by all other threads operating within the same process. Multiple threads cannot use static variables separately because other threads within the process can overwrite the values stored at the variable memory location. Thus, the development of multi-threaded programs using static variables often requires explicit thread harmonization by the programmer. Another problem is that threads within the same process must use unique static variable IDs to avoid reading or writing to the location of another static variable. This also requires thread harmonization by the programmer. Accordingly, in view of the shortcomings associated with existing thread-static data implementations, there remains a need for an efficient thread-static data implementation that can be used on most modern operating systems. The present invention provides embodiments of a method, data processing system, and computer program product that efficiently implements thread-static data without registering pointers. The present invention efficiently implements static thread data in a multi-threaded program. The static thread data of each thread is allocated to the top of the virtual memory block belonging to the corresponding stack of each thread. An address mask is created for each thread so as to extract the base address of the static thread data region of the stack for each thread from the corresponding stack pointer. When a thread in execution needs to access its static thread data, it accesses the static thread data variable according to the virtual memory address extracted from the stack pointer using the address mask.

15 Claims, 5 Drawing Sheets

IMPLEMENTATION OF THREAD-STATIC DATA IN MULTI-THREADED COMPUTER SYSTEMS

FIELD OF THE INVENTION

The present invention relates to computer systems, and more particularly to implementation of thread-static data in multi-threaded computer systems.

BACKGROUND OF THE INVENTION

Multi-threaded computer systems are computers with operating systems that allow the sharing of system resources among multiple threads. Multi-threaded computer systems increase computer performance by allowing multiple streams of instructions to be processed by the computer's central processing unit (CPU) at the same time. Operating systems differ in both the extent and manner in which they support multi-threading. Accordingly, the meaning and attributes of threads differ between operating systems. Generally, a thread is an independent, schedulable, stream of instructions belonging to a particular program. As a schedulable entity, a thread has only those properties that are required to ensure its independent flow of control. These properties include a stack, scheduling properties such as policy and priority, a set of pending and blocked signals, and thread specific data.

Multi-threaded computer programs require support from the operating system or programming language. Most modern operating systems provide libraries so that programmers can create multi-threaded applications. Some programming languages, in particular, object-oriented languages such as Java and Ada, build support for threads into the programming language. For example, the Java programming language provides the class Thread that models threads and allows the creation of multi-threaded programs. Program development tools, application subsystems, and middleware also provide thread management capabilities.

Traditionally, thread implementations provided by operating systems differed significantly from one another, making it difficult to develop portable multi-threaded programs that can be used on different systems without recoding. One solution to this problem was the creation of a set of standardized operating system interfaces known as POSIX (Portable Operating System Interface). The POSIX.4a specification provides a set of Application Program Interfaces (APIs) that allow a C programmer to include thread support in their programs. Thread implementations adhering to this standard are referred to as POSIX threads or Pthreads. The problem with the POSIX standard is that it was defined for the C programming language only. Efforts to define the POSIX standard for other languages are still in progress, and while programmers in some programming languages can use the POSIX standard by using wrappers around C function calls, the POSIX standard has not been uniformly adopted and proprietary versions of threads persist. Known proprietary thread implementations, by way of example, are those of IBM's AIX, Sun's Solaris and Microsoft's Windows NT systems.

Many computer systems cannot execute multiple threads simultaneously due to competition for CPU resources among the multiple threads. Most desktop computers execute threads in a concurrent interwoven fashion, overlapped in time. As a schedulable entity, each thread can be allocated a number of CPU cycles by the operating system. For this reason, a thread is sometimes referred to as an independent flow of control. The amount of "time" each thread is given control of the CPU occurs so fast and in such rapid succession that it resembles simultaneous execution. The execution of one program instruction may require the execution of several machine instructions. With multiple threads allocated among a fixed number of CPU cycles by the operating system, a thread may not complete the execution of a program instruction before relinquishing control of the CPU to another thread. When a thread resumes processing, it often requires access to data it was using when it relinquished control. However, multi-threaded programs use local variables which are dynamically allocated on the stack. Consequently, threads do not hold static data over successive calls or return a pointer to static data.

Threads can be generated by different programs or by a single program with sufficient parallelism. In a multi-threaded computing environment, the multiple threads may belong to a single program, or each thread may belong to a different program, or several threads may belong to one program with other threads belonging to another program.

During the operation of a program, the operating system may create processes or tasks to execute program instructions. A single program may have multiple processes in execution, and each process can have multiple threads. Illustratively, a process in the UNIX environment contains information about program resources and the program execution state, including: process ID, environment, working directory, program instructions, and registers. A process also provides a common address space and common system resources, including: file descriptors, signal actions, shared libraries and inter-process communication tools (such as message queues, semaphores, and shared memory). A thread exists within a process and uses the process resources.

All threads within a process share system resources and operate in the same address space. Static variables declared within a computer program have a static storage location. Accordingly, references to a static variable from any thread will refer to the memory location allocated to that variable. Multiple copies of static variables location are not created as they may be with other variables types. The value of a static variable will always be the last value written to its memory. One of the primary advantages of static variables is that their values persist between references, and will exist for as long as the program operates. In a multi-threaded program, static variables allow a thread to resume execution of its instructions and access data it was using before it relinquished control of the CPU to another thread.

One of the primary difficulties that result from using static variables in multi-threaded computer programs is that changes to a static variable made by one thread will be seen by all other threads operating within the same process. Multiple threads cannot use static variables separately because other threads within the process can overwrite the values stored at the variable memory location. Thus, the development of multi-threaded programs using static variables often requires explicit thread harmonization by the programmer. Another problem is that threads within the same process must use unique static variable IDs to avoid reading or writing to the location of another static variable. This also requires thread harmonization by the programmer.

One known solution to the problems created by using static variables in multi-threaded computer programs is thread-static data variables. Thread-static variables are static variables that are accessed and used separately by each thread. Thread-static variables are local to the thread to which they relate. Most computer languages do not provide thread-static data variable so computer programmers have been forced to develop their own thread-static data implementations. The primary disadvantage of most thread-static data implementations is the high cost of system resources. Known thread-static data implementations typically require 50 CPU instructions or more.

In most thread implementations, each thread is allocated a block of virtual memory, known as a stack, for use as temporary storage of local data and other information during its execution.

According to one known implementation, thread-static data is allocated on the stack by declaring it as an auto variable in a function executed by each thread accessing the data. To access the data, a thread must specify the address of the thread-static data using a functional argument from the thread's calling function to the called function. The primary disadvantage with this approach is that the thread-static data cannot be accessed directly, so the program becomes complicated and the execution efficiency is lowered. Another disadvantage with this approach is that it requires storing the address of the thread-static data on the stack.

Other known implementations involve the use of thread identifiers or IDs. According to one implementation, a global array is declared with as many elements as there are threads. Each thread is assigned a unique thread ID. Threads access the thread-static data from the global array using their respective thread IDs. One problem with this approach is that not all operating systems support thread IDs. Where thread IDs are not supported, it is necessary to support thread IDs within the program, thereby lowering the execution efficiency. Even when thread IDs are supported by the operating system, this implementation does not work where the number of threads changes dynamically because the maximum number of threads supported is fixed by the size of the global array.

One known solution to this problem involves hashing the thread IDs. Typically, such implementations obtain the current thread ID and use it as an index into a hash table that would provide the address of the thread's static data region. The primary disadvantage of this approach is that obtaining the current thread ID often involves the use of a system call. Systems calls are very expensive in terms of resource utilization and lower system performance. Furthermore, a hash table look up can require 10's of CPU instructions. For example, 50 CPU instructions or more may be required to access the static data of the current thread.

Another known implementation involves registering pointers to thread-static data. According to one implementation, thread-static data to be used by each one of the multiple threads is detected and allocated to each thread's respective stack. Pointers are then registered to indicate the top and base addresses of the thread-static data region in the stack for each one of the multiple threads. Access instructions indicate variable offsets within the thread-static data region of each stack. Thread-static data variables are then accessed using the pointer to the base address of the thread-static data region and the position of the data variable within this region as indicated by the access instructions. This implementation allows thread-static data to be declared globally without thread IDs, and can accommodate changes in the number of threads which result from the creation and termination of threads. This approach is more efficient than those previously described because it requires less complicated programming and can access data directly. The primary limitation of this method is that most modem operating systems do not generally allow application programs to devote CPU registers to specific usages.

Accordingly, in view of the shortcomings associated with existing thread-static data implementations, there remains a need for an efficient thread-static data implementation that can be used on most modem operating systems.

BRIEF SUMMARY OF THE INVENTION

The present invention provides embodiments realized as a method, computer system, and computer program product for improved implementation of thread-static data without registering pointers. The method can be used in programs written in many different programming languages, and is useable on many different operating systems.

The present invention provides embodiments realized as a method, computer system and computer program product for implementing thread-static data in a multi-threaded computer system.

According to one embodiment of the invention, thread-static data to be used by newly generated threads is detected before any of the threads' instructions are executed. Each thread containing thread-static data is allocated a block of virtual memory for use as a stack. The size of the virtual memory block allocated to the stack is 2n where n is a positive integer selected such that 2n is larger than the stack requirements and thread-static data requirements. The base address of the virtual memory block is selected to be divisible by 2n. The thread-static data of each thread is allocated to the top of each thread's respective virtual memory block according to a selected positioning method. The stack pointer (SP) of each thread is set to the virtual memory address immediately following the thread-static data region. An address mask (MASK) is created for each thread to extract the base address of the corresponding stack's virtual memory block from its stack pointer so that the thread-static data can be easily accessed by the thread during its execution. The address mask is stored in memory and the thread's entry point is invoked.

When a thread needs to access thread-static data during its execution, it calculates the logical product of the expression MASK & SP to obtain the base address of the thread-static data region. The address of the desired thread-static data variable is then determined using the base address of the thread-static data region and the selected variable's location within this region as specified by the positioning method. The thread can then access the desired variable directly using its virtual memory address.

In one aspect, the present invention provides method for determining an address of static thread data during execution of a thread in a data processing system, the data processing system being operatively coupled to memory for storing the thread and static thread data associated with the thread, the method including associating an address mask with the thread stored in memory, the address mask comprising a component for determining an address of the static thread data, and logically combining the address mask with an address for the thread being executed to determine the address for the static thread data.

In another aspect, the present invention provides system for implementing static thread data in a data processing system, the data processing system having memory and operating a program executing one or more threads, each of the threads having an associated stack and a stack pointer, the system including an address mask component for associating an address of static thread data stored in memory with the thread, a logical component for logically combining the address mask component with a current address corresponding to the thread being executed to determine an address in the memory for the static thread data.

In yet another aspect, the present invention provides a computer program product for implementing static thread data in a data processing system having memory and executing one or more threads, each of the threads having an associated stack and a stack pointer, the computer program product including a computer useable storage medium having computer readable program code means embodied in the medium, the computer readable program code means including computer readable program code means for directing the data processing system to associate an address mask with the thread being executed, and computer readable program code means for directing the data processing system to logically combine the address mask with a current address in the thread being executed to determine an address in the memory for the static thread data.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference will now be made to the accompanying drawings which show, by way of example, preferred embodiments of the present invention, and in which.

DETAILED DESCRIPTION OF THE PREFERRED EMBODIMENTS

Figure 1:
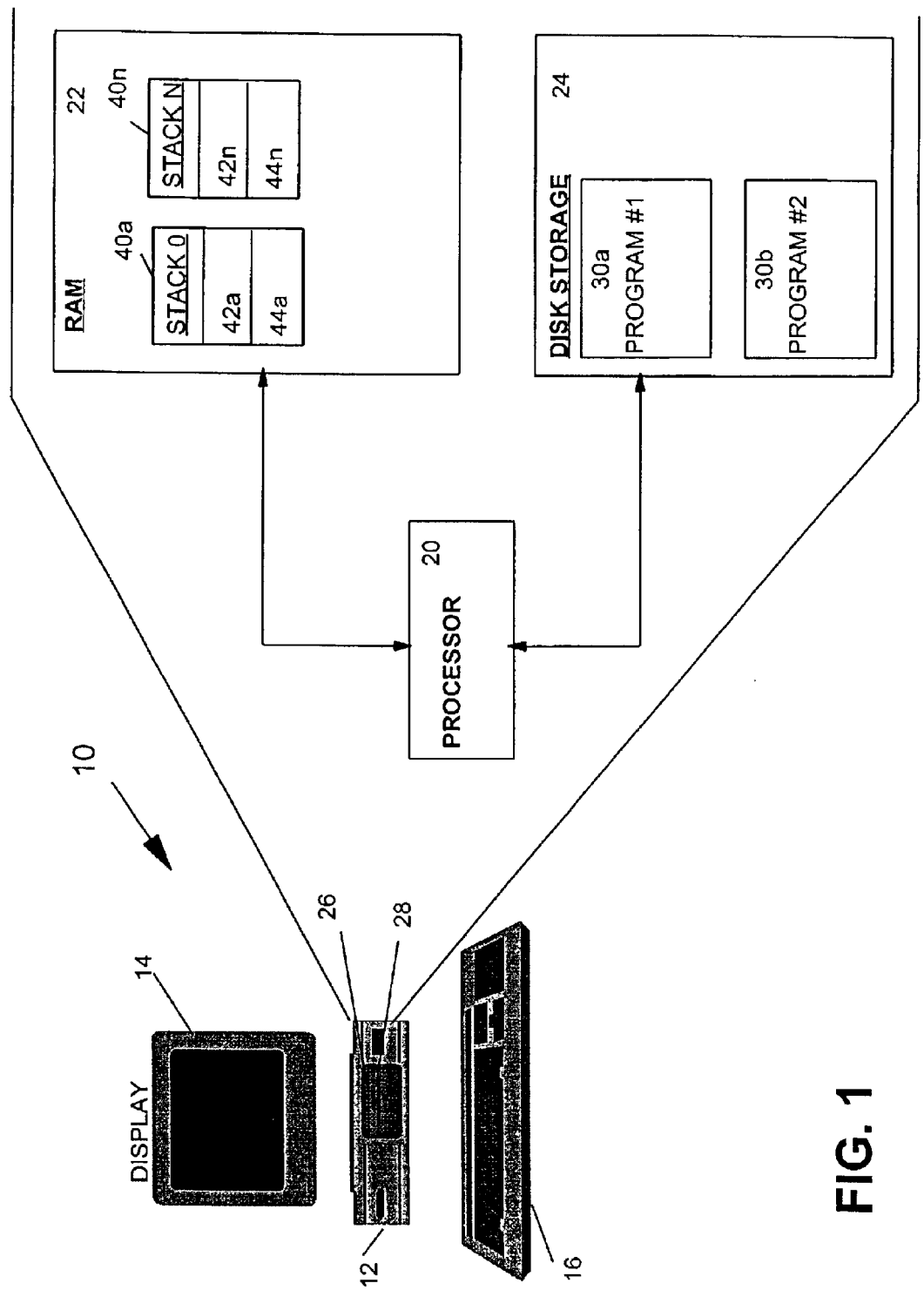
FIG. 1 shows in diagrammatic form a computer system for practising the invention according to the present invention.

Reference is first made to FIG. 1 which shows in diagrammatic form a computer system indicated by reference 10 for operating a thread-static data mechanism in accordance with the present invention.

The computer system 10 as shown in FIG. 1 includes a processing unit 12, a display unit 14, and a keyboard 16 and other input devices such as a mouse (not shown). The processing unit 12 is configured in a conventional manner and includes one or more processors 20, random access memory or RAM 22, and mass storage devices, such as a hard disk drive 24, a compact disk or CD drive 26, and a floppy disk drive 28. Computer or application programs 30, indicated individually by references 30a, 30b, are installed on the hard disk drive 24, and instructions for the computer program 30 are executed by processor 20 in RAM 22. The computer program product 30 may include application programs such as the DB2TM database management system from IBM. In the context of the present invention, the computer program product 30 includes the capability for executing multiple threads or multi-threading operation.

The thread-static data mechanism according to this aspect of the invention is implemented in the computer program product 30 which runs on the computer system 10. As will be described in more detail below, the thread-static data mechanism allocates a stack 40 in RAM 22 for each thread being executed by the computer program 30. The stacks 40, indicated individually by references 40a to 40n in FIG. 1, are used for storing local data during the execution of the thread, i.e. temporary storage of data by the functions called and executed by the thread. According to the invention, the stack 40 for each thread includes a thread-static data area 42 and a stack area 44. The thread-static data area 42 is for storing static variables associated with the thread, and accessing the static variables through the thread-static mechanism. The stack area 44 is for storing addresses and non-static data variables during the execution of the thread.

Figure 2:
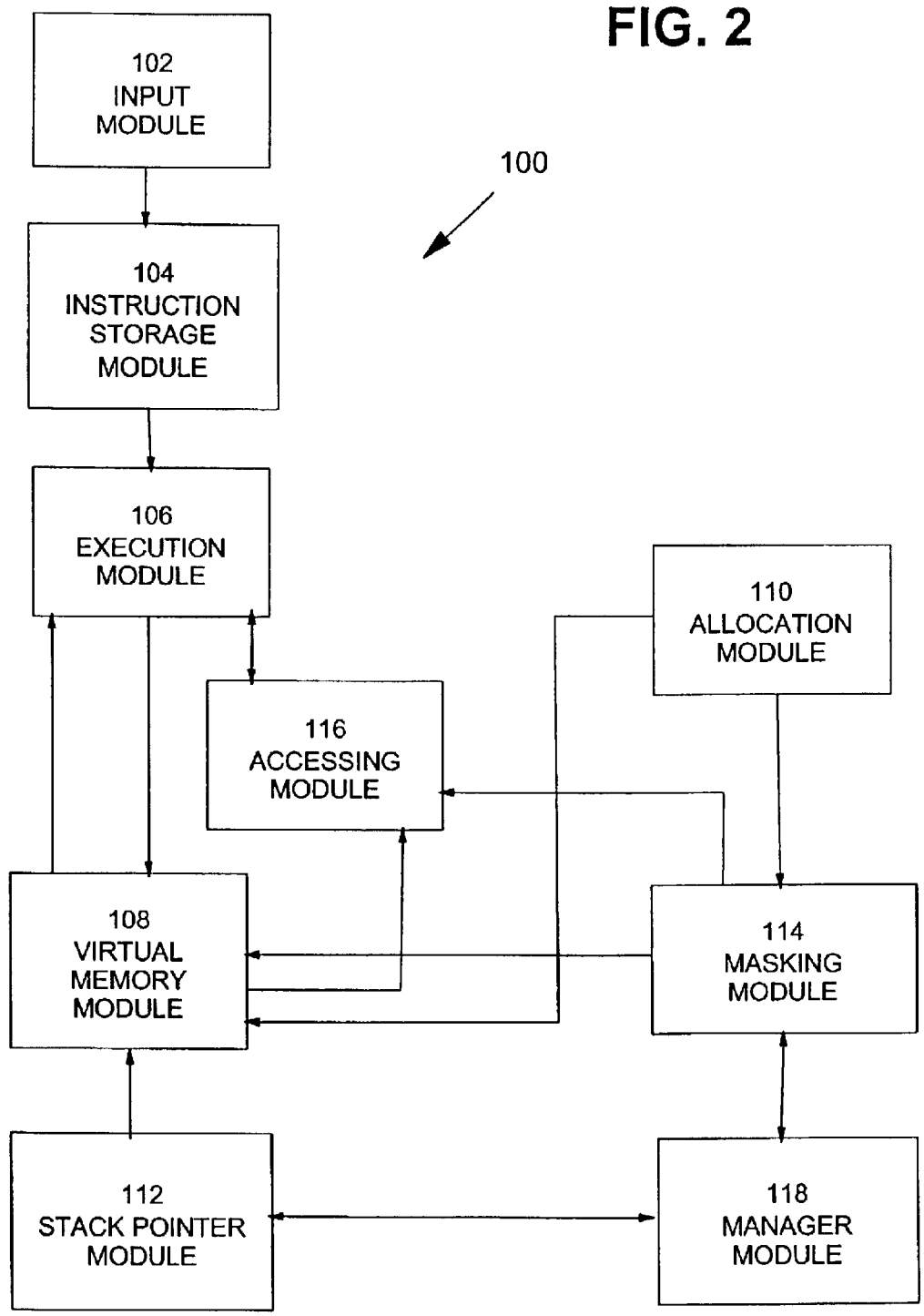
FIG. 2 shows in block diagram form one embodiment for implementing a thread-static data mechanism according to the present invention.

Reference is made to FIG. 2 which shows an implementation for a thread-static mechanism 100 according to the present invention. The thread-static mechanism 100 is implemented in functional modules in the computer program product (a multi-threaded capable program) 30 which are executed by the processor 20 during operation of the computer program product 30.

As shown in FIG. 2, the thread-static mechanism 100 comprises an input module 102, an instruction storage module 104, an execution module 106, a virtual memory module 108, an allocation module 110, a stack pointer module 112, a masking module 114, an access module 116, and a thread manager module 118.

The input module 102 is a functional module for inputting code from the multi-threaded computer program product 30 (FIG. 1). The instruction storage module 104 is a functional module for storing program instructions from the multi-threaded computer program 30. The execution module 106 is a functional module for executing the program instructions in one or more threads. The virtual memory module 108 is a functional module for providing a stack 40 (FIG. 1) in RAM 22 (FIG. 1) corresponding to each thread being executed by the execution module 106. The allocation module 110 is a functional module for allocating the thread-static data area 42 (FIG. 1) in each of the stacks 40 (FIG. 1) in the virtual memory, i.e. RAM 22 (FIG. 1) according to a selected positioning method as described in more detail below. The stack pointer module 112 is a functional module for managing a stack pointer (SP) for each thread being executed by the execution module 106. The masking module 114 is a functional module for selecting and storing an address mask (MASK) for each of the stacks 40 (FIG. 1) stored in the virtual memory (i.e. the RAM 22 FIG. 1). The accessing module 116 is a functional module for accessing the thread-static data for each of the stacks 40 (FIG. 1) in the virtual memory, i.e. the RAM 22 (FIG. 1).

The thread manager module 118 is a functional module for managing the virtual memory 108, the stack pointer module 112, and the masking module 114 so that each of the threads being executed by the execution module 106 is executed according to the program instructions of the instruction storage module 104. The functions of the thread manager module 118 comprise controlling the values stored in the stack pointer module 112 and the masking module 114 for each of the threads being executed by the execution module 106. The thread manager module 118 also switches the settings in the stack pointer module 112 and the masking module 114, in response to a change in the thread being executed by the execution module 106. When the thread currently being executed by the execution module 106 is switched from one thread to another, the thread manager module 118 adjusts the settings of the stack pointer and an address mask indicated by the stack pointer module 112 and the masking module 114 as will be described in more detail below.

It will be appreciated that the creation of a thread-static data area 42 (FIG. 1) in each of the stacks 40 (FIG. 1) for the corresponding thread being executed by the execution module 106 allows the use of static variables that can be accessed and used separately by each thread. The manipulation of static variables in the thread-static data 42 in the stack 40 (FIG. 1) by the thread-static data mechanism is now described in more detail below with reference to the drawings.

In operation, the computer program 30 (FIG. 1) is loaded from memory 24 (FIG. 1) and program instructions are generated for execution by the processor 20 (FIG. 1). With reference to FIG. 2, the computer program is loaded by the input module 102 and the program instructions are stored in the instruction storage module 104. The execution module 106 generates one or more threads for executing the computer program according to program instructions in the instruction storage module 104. The allocation module 110 detects if there is thread-static data for any of the newly generated threads before any of the program instructions for the thread are executed. The allocation module 110 creates a stack 40 (FIG. 1) for the thread in the virtual memory, i.e. the RAM 22 (FIG. 1). The stack 40 comprises a thread-static data area 42 (FIG. 1) in addition to the stack area 44. The thread-static data of each thread is then allocated to the thread-static data area 42 of the stack 40 by the allocation module 110. As will be described in more detail below, the thread-static data mechanism includes a positioning method for manipulating the thread-static data in the stack 40. The stack pointer module 112 then sets a stack pointer (SP) corresponding to each newly generated thread using thread-static data to the virtual memory address immediately following the thread-static data area 42 in the stack 40 for each of the threads. The masking module 114 selects and stores an address mask (MASK) for each of the stacks 40 stored in the virtual memory 108 so that the base address of the corresponding thread-static data area 42 can be determined whenever the thread needs to access its thread-static data.

If during the execution of a thread by the execution module 106 a thread-static data variable needs to be accessed, the accessing module 116 retrieves the thread-static data variable from the stack 40 for the thread by determining the base address of the thread-static data area 42 for the stack 40 associated with the thread currently being executed. According to this aspect, the base address is determined using the value of the stack pointer or SP and the address mask or MASK indicated by the stack pointer module 112 and the masking module 114 respectively. The accessing module 116 then determines the virtual memory address of the thread-static data variable using the base address determined for the thread-static data area 42 (FIG. 1) and the selected variable's location within the area 42, i.e. as indicated by the program instructions for executing thread. The thread can then access the desired variable directly using its virtual memory address.

Figure 6:
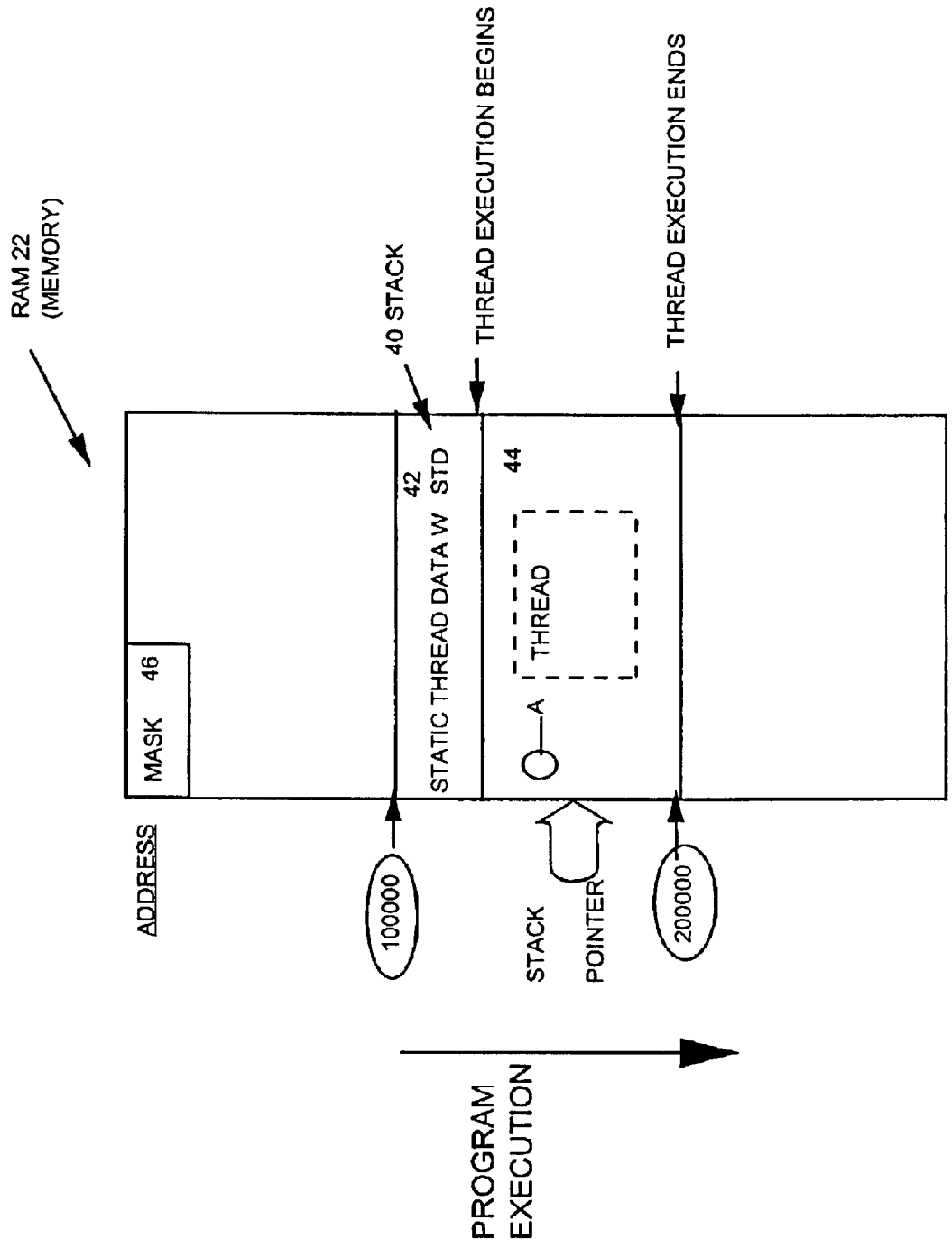
FIG. 6 shows in diagrammatic form a stack in memory for the thread-static data mechanism according to the present invention.

The operation of the thread-static mechanism is further illustrated with reference to FIG. 6. As shown in FIG. 6, the stack 40 for a thread is allocated in the memory 22 and comprises the static thread data area 42 and the stack area 44 as described above. In this example, the stack 40 starts at memory address 100000h and ends at address 200000h. As also shown in FIG. 6, the MASK indicated by reference 46 is also stored in memory 22 for use by the thread-static mechanism. In the execution of the thread, a stack pointer 48 points to the address in memory 22 of the currently executing thread instruction. At execution point A, the thread requires a static thread data variable. The static thread data variable is stored in the static thread data area 42 in memory 22, and the location, i.e. address in memory 22, for the static thread data is determined by logically combining the MASK 46 with the current address of the stack pointer 48. The static thread data is then retrieved from memory 22 and execution of the thread continues.

Figure 3:
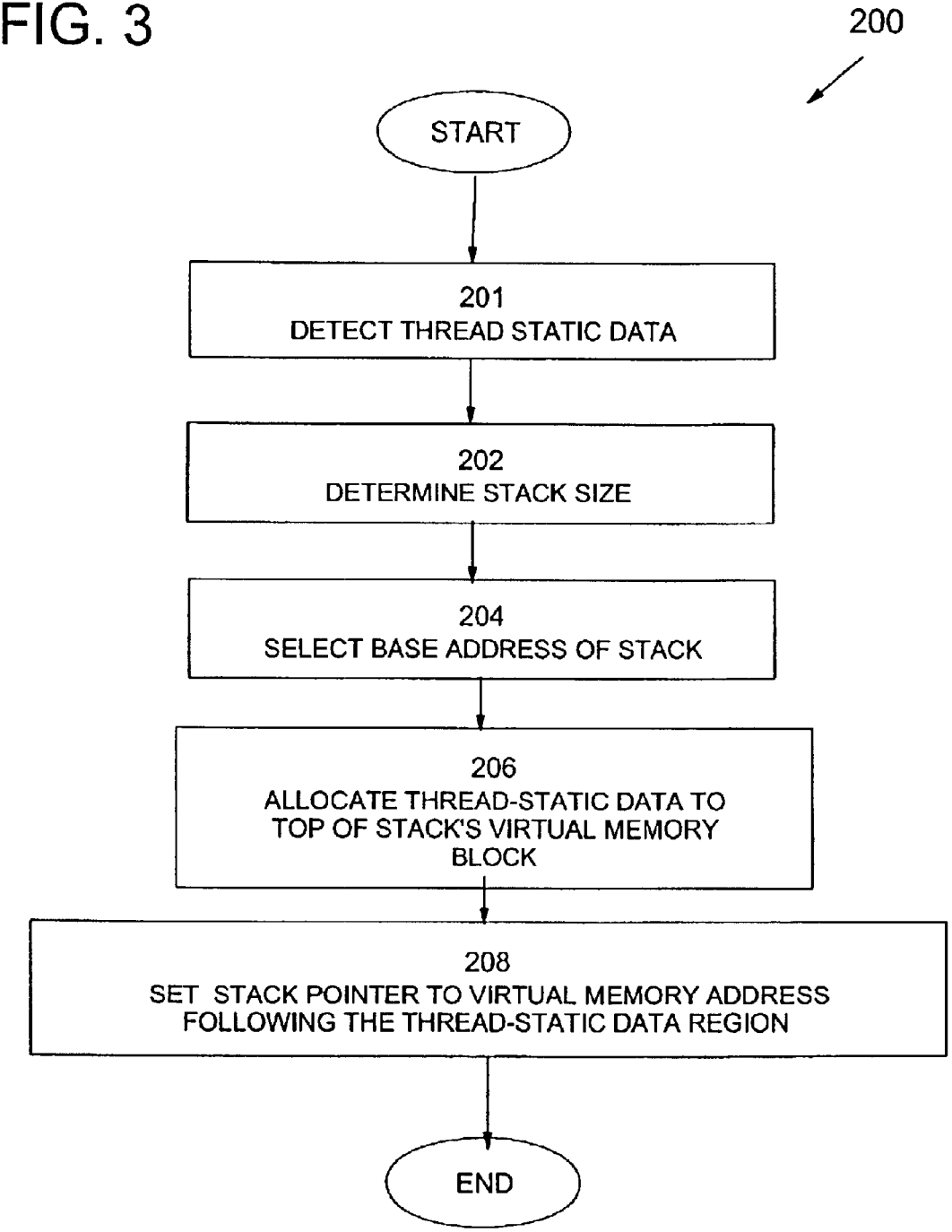
FIG. 3 shows in flowchart form the operation of the allocation functional module for the thread-static data mechanism of FIG. 2.

Reference is next made to FIG. 3, which shows in flowchart form a process 200 for the operation of the allocation module 110 (FIG. 2). The first operation as indicated in step 201 involves the allocation module 110 determining if any of the newly generated threads will be using thread-static data. Next, in step 202, the allocation module 110 determines the memory block size to be allocated to the stack 40 (FIG. 1) in virtual memory, i.e. RAM 22 (FIG. 1). The size of memory block for the stack 40 is determined to have a value of 2n where n is a positive integer selected such that 2n is larger than the stack requirements and thread-static data requirements. In step 204, the allocation module 110 selects a base address for the virtual memory block for the stack 40 and the base address is selected from available addresses in the virtual memory which are divisible by 2n. The implementation of the base address selection function will be apparent to one of ordinary skill in the art. In step 206, the allocation module 110 allocates the thread-static data for each of the threads to the thread-static data area 42 in the stack 40 for each of the threads according to a selected positioning method as indicated by the program instructions for the respective thread. Many methods for organizing data within the thread-static data region 42 will be apparent to one of ordinary skill in art. Lastly in step 208, the allocation module 110 sets the stack pointer or SP for the thread to the virtual memory address immediately following the thread-static data area 42 in the stack 40 associated with the thread.

Figure 4:
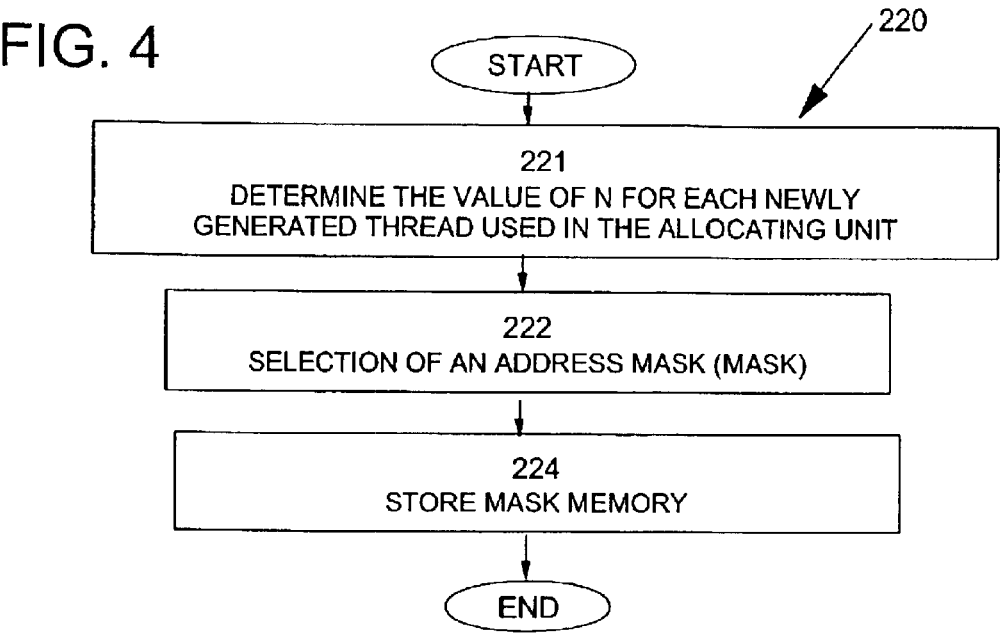
FIG. 4 shows in flowchart form the operation of the masking functional module for the thread-static data mechanism of FIG. 2.

Reference is next made to FIG. 4 which shows in flowchart form a process 220 for the operation of the masking module 114 (FIG. 2). In step 221, the masking module 114 determines the value 'n' (i.e. 2n) as selected by the allocation module 110 (as described above) for each newly generated thread. Next in step 222, the masking module 114 selects an address mask or MASK for each of the threads. The masking module 114 selects the value of MASK such that the MASK has a binary value with 1's in all bitfields except for those lower than 2n. Lastly in step 224, the masking module 114 stores the address mask or MASK in memory.

Figure 5:
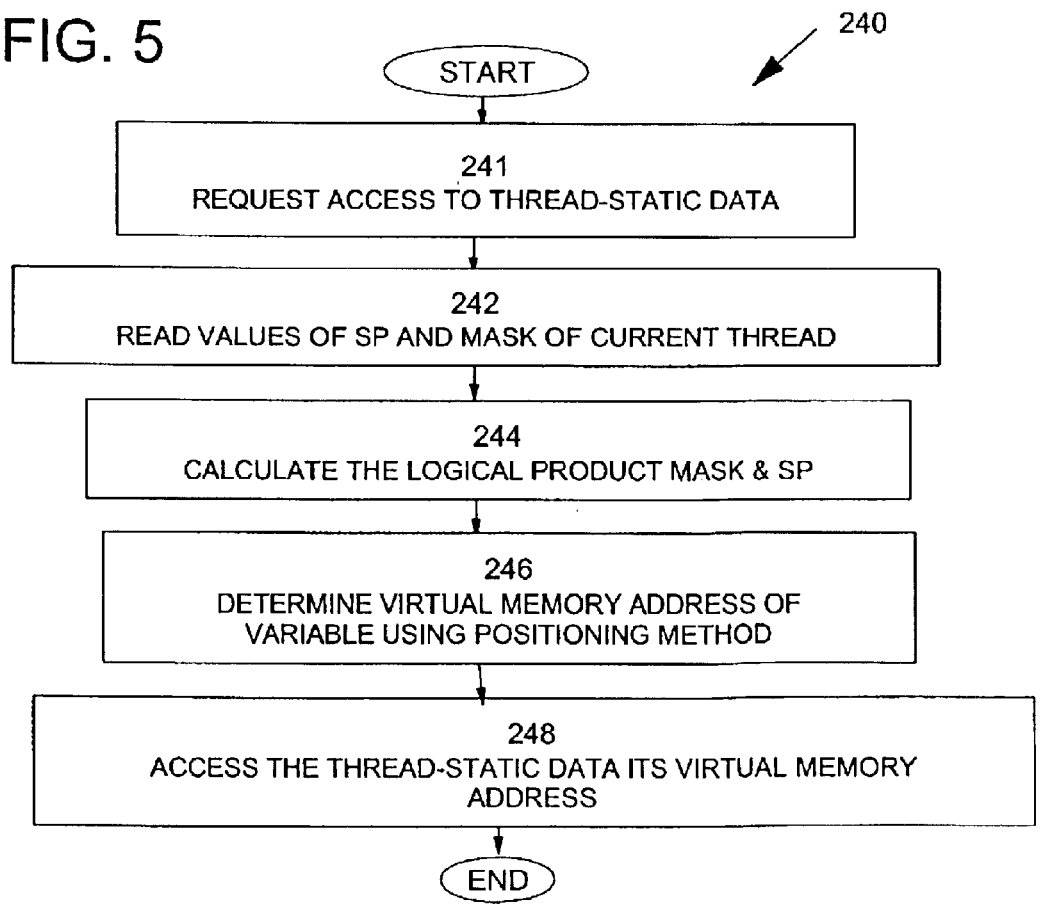
FIG. 5 shows in flowchart form the operation of the accessing functional module for the thread-static mechanism of FIG. 2.

Reference is next made to FIG. 5 which shows in flowchart form a process 240 for operation of the accessing module 116 (FIG. 2). The first operation involves a thread requiring access to a thread-static data variable making a request to the accessing module 116 as indicated in block 241. Next in step 242, the accessing module 116 reads the values of stack pointer (SP) and the MASK for the thread currently being executed in the execution module 106 (FIG. 2) from the stack pointer module 112 and the masking module 114, respectively. Next in step 244, the accessing module 116 calculates the logical AND product of the binary bit values for the stack pointer SP and the MASK. Next in step 246, the accessing module 116 determines the virtual memory address of the desired thread-static data variable using the base address of the thread-static data area 42 as determined by the logical AND product of SP & MASK, and the position of the variable within the thread-static data area 42 as indicated by the program instruction. In step 248, the thread uses the resultant virtual memory address to access the thread-static data variable in the thread-static data area 42 of the stack 40.

To further illustrate the operation of the thread-static data mechanism according to the present invention, the following example is provided. It is to be understood that the invention is not limited to the specific conditions, variables, or details set forth in the following example. Illustratively, a multi-threaded computer program 30 generates program instructions to be executed using three threads T1, T2, and T3. The thread T1 requires 50 kb of stack space and 10 kb of thread-static data. The thread T1 will be used to illustrate one embodiment of the invention. It is to be appreciated that the threads T2 and T3 are independent of each other and of T1. The properties and attributes of T2 and T3 need not be known for the purposes of this illustration.

According to this example, the allocation module 110 (FIG. 2) first determines that 10 kb of thread-static data is to be used by the newly generated thread T1 (step 201 in FIG. 3). Next the allocation module 110 determines the size of the virtual memory block allocated to T1's stack to be 26 or 64 kb or 0×10000 (step 202 in FIG. 3). A larger virtual memory block could also be selected, such as 27 or 26 for example, but 26 is the smallest virtual memory block that is selected for T1. Next, the allocation module 110 selects the base address of T1's stack from available virtual memory addresses to be 0×2D0000 (step 204 in FIG. 3). Other virtual memory address that are divisible by 26 could have been selected, for the purposes of this example, it will be assumed that 0×2D0000 was selected by the address selection routine. Next, the allocation module 10 allocates the thread-static data to the thread-static data area 42 (for example the top of the stack 40 for the thread T1 according to the selected positioning method) according to step 206 in FIG. 3. Accordingly, the stack 40 for the thread T1 would consume addresses 0×2D0000 to 0×2DFFFF with its thread-static data area 42 occupying addresses 0×2D0000 to 0×2D27FF. Finally, the allocation module 110 sets the stack pointer (SP) for the thread T1 to 0×2D2800.

Continuing with this example, the operation of the masking module 114 (FIG. 2) according to the procedure in FIG. 4 is as follows. First, the masking module 114 determines the value of n selected by the allocation module 110 as 6 in step 221 of FIG. 4. Next, the masking module 114 selects the address mask (MASK) of 0×FFFF0000 in step 222 of FIG. 4. Lastly, the masking module 114 stores the address mask (MASK) in memory.

The operation of the accessing module 116 (FIG. 2) in the context of this example is as follows. First in step 241 of FIG. 5, a request access to a thread-static data variable, "data" for example, is made. At this point in the execution of the threads T1, T2 and T3, the thread T1 has completed some of its program instructions so the value of the stack pointer SP for T1 has changed from the value set earlier. For the purpose of this example, it will be assumed that the current value of SP for T1 is 0×2DA042. It is to be appreciated that because the current thread in execution is T1, the thread manager module 118 (FIG. 2) has switched the settings for SP and MASK indicated by the stack pointer module 112 (FIG. 2) and the masking module 114 respectively to reflect those of thread T1. Next the accessing module 116 reads the values of stack pointer SP and the MASK for the thread T1 to be 0×2DA042 and 0×FFFF0000 respectively, as indicated in step 242 in FIG. 5. Next in step 244 of FIG. 5, the accessing module 116 calculates the logical AND product of the MASK & SP to be 0×0002D0000. Next according to step 246 in FIG. 5, the accessing module 116 determines the virtual memory address of "data" using the base address of the thread-static data area 42 (FIG. 1) indicated by SP & MASK and the position of "data" within the thread-static data area 42 as indicated by the program instructions Illustratively, the variable "data" has been allocated to the top of the thread-static area 42. Thus, the virtual memory address of variable "data" is determined as 0×0002D0000. Finally according to step 248 in FIG. 5, the thread T1 accesses the thread-static data variable "data" at the virtual memory address 0×0002D0000.

While the foregoing example generated three threads, it is to be understood that the present invention is equally applicable to multi-threaded computer programs which generate more than three threads and less than three threads. In summary, the present invention provides a mechanism implemented in a method, in a computer system, and in a computer program product that efficiently implements thread-static data without requiring the need to register pointers.

In terms of implementation, the thread-static data mechanism according to the present invention can be used by any multi-threaded computer program product such as the database management application program sold under the DB2™ name from IBM. Furthermore, the thread-static data mechanism can be implemented in computer programs running on single processor or multiprocessor computer platforms.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

The embodiments of the invention in which an exclusive property or privilege is claimed are defined as follows:

1. A method for determining an address of static thread data during execution of a thread in a data processing system, the data processing system being operatively coupled to memory for storing the thread and static thread data associated with the thread, the method comprising:

associating an address mask with the thread stored in memory, said address mask comprising a component for determining an address of said static thread data; and logically combining said address mask with an address for the thread being executed to determine the address for said static thread data.

2. The method as claimed in claim 1, wherein said address for the thread is contained in a stack pointer, and said stack pointer indicating a current executing address in the thread.

3. The method as claimed in claim 1, wherein said logically combining includes AND'ing said address mask with said address of the thread being executed.

4. The method as claimed in claim 1, further comprising allocating an area of the memory for a stack space, said stack space storing thread being executed, and an area for storing static thread data.

5. The method as claimed in claim 1, further comprising accessing said static thread data stored in memory based on the address determined for the static thread data.

6. A system for implementing static thread data in a data processing system, said data processing system having memory and operating a program executing one or more threads, each of said threads having an associated stack and a stack pointer, the system comprising:
  an address mask component for associating an address of static thread data stored in memory with the thread; and
  a logical component for logically combining said address mask component with a current address corresponding to the thread being executed to determine an address in the memory for said static thread data.

7. The system as claimed in claim 6, wherein said current address is derived from an address stored in the stack pointer.

8. The system as claimed in claim 6, wherein said logical component performs logical AND operation between said address mask component and said current address.

9. The system as claimed in claim 6, further comprising an allocation component for allocating an area in the stack for storing the thread, and another area in the stack for storing static thread data.

10. The system as claimed in claim 6, further comprising a component for accessing the static thread data for the thread using the memory address from said logical component.

11. A computer program product for implementing static thread data in a data processing system having memory and executing one or more threads, each of said threads having an associated stack and a stack pointer, said computer program product including a computer useable storage medium having computer readable program code means embodied in the medium, the computer readable program code means comprising:
  computer readable program code means for directing said data processing system to associate an address mask with the thread being executed; and
  computer readable program code means for directing said data processing system to logically combine said address mask with a current address in the thread being executed to determine an address in the memory for said static thread data.

12. The computer program product as claimed in claim 11, further comprising computer readable program code means for directing said data processing system to determine said current address from the stack pointer.

13. The computer program product as claimed in claim 11, wherein said computer readable program code means for directing said data processing system to logically combine includes performing a logical AND operation.

14. The computer program product as claimed in claim 11, further comprising computer readable program code means for directing said data processing system to allocate an area allocating an area in the stack for storing the thread, and another area in the stack for storing static thread data.

15. The computer program product as claimed in claim 11, further comprising computer readable program code means for directing said data processing system to access said static thread data stored in memory using the address determined from the logical combination of said address mask and said current address.

* * * * *